(12) United States Patent
Chintala

(10) Patent No.: US 9,756,187 B2
(45) Date of Patent: Sep. 5, 2017

(54) AUTOMATIC CALL MUTING AND APPARATUS USING SOUND LOCALIZATION

(71) Applicant: Sandeep Kumar Chintala, Surrey (GB)

(72) Inventor: Sandeep Kumar Chintala, Surrey (GB)

( * ) Notice: Subject to any disclaimer, the term of this patent is extended or adjusted under 35 U.S.C. 154(b) by 5 days.

(21) Appl. No.: 14/421,692

(22) PCT Filed: Aug. 13, 2013

(86) PCT No.: PCT/GB2013/052151
§ 371 (c)(1),
(2) Date: Feb. 13, 2015

(87) PCT Pub. No.: WO2014/027190
PCT Pub. Date: Feb. 20, 2014

(65) Prior Publication Data
US 2015/0222755 A1 Aug. 6, 2015

(30) Foreign Application Priority Data
Aug. 13, 2012 (GB) .................................. 1214369.9

(51) Int. Cl.
*H04M 3/42* (2006.01)
*H04M 3/56* (2006.01)
(Continued)

(52) U.S. Cl.
CPC ............ *H04M 3/568* (2013.01); *G10L 17/26* (2013.01); *G10L 25/51* (2013.01);
(Continued)

(58) Field of Classification Search
CPC ..... H04M 3/568; H04M 1/6033; G10L 25/51; G10L 17/26; H04W 4/16; H04R 29/001; H04R 2499/11
(Continued)

(56) References Cited

U.S. PATENT DOCUMENTS 7,843,486 B1 * 11/2010 Blair .................... H04M 3/568
348/14.01
2006/0233389 A1 10/2006 Mao et al.
(Continued)

FOREIGN PATENT DOCUMENTS

EP 1505815 2/2005
EP 2496000 9/2012
GB 2003002 2/1979

OTHER PUBLICATIONS

International Search Report and Written Opinion dated Sep. 26, 2013 for PCT/GB2013/052151 filedAug. 13, 2013.
(Continued)

*Primary Examiner* — Tanmay Shah
(74) *Attorney, Agent, or Firm* — Thompson Hine LLP

(57) ABSTRACT

A mobile telephone device (10) comprises a microphone (20) and one or more spaced audio sensors (12) to sense the position and/or voice characteristics of one or more individual speakers (16). A mute control means (14) employs sound phase, and/or sound time of arrival, and/or sound loudness to create a map of the positions of individual speakers (16). The mute control means (14) identifies individual speaker (16) voice characteristics using one, the other or both of audio signal analysis of the sound of individual speaker's voices; and use of voice CODEC analysis results for each individual speaker. A call may involve no sound muting, may involve sound muting except for one individual speaker (16), or sound muting except for any one of a plurality of accepted individual speakers. A default individual speaker position immediately before and closest the microphone is provided. Positional tolerance for individual speakers of at least 5% to 10% is employed.

17 Claims, 4 Drawing Sheets

(51) Int. Cl.

| | |
|---|---|
| *H04M 1/60* | (2006.01) |
| *H04R 29/00* | (2006.01) |
| *G10L 17/26* | (2013.01) |
| *G10L 25/51* | (2013.01) |
| *H04W 4/16* | (2009.01) |

(52) U.S. Cl.
CPC ........ H04M 1/6033 (2013.01); H04R 29/001 (2013.01); H04W 4/16 (2013.01); *H04R 2499/11* (2013.01)

(58) Field of Classification Search
USPC ........................................................ 455/416
See application file for complete search history.

(56) References Cited

U.S. PATENT DOCUMENTS

| | | | |
|---|---|---|---|
| 2008/0160977 A1 | 7/2008 | Ahmaniemi et al. | |
| 2008/0170717 A1* | 7/2008 | Liu ........................... | G01S 5/30 381/92 |
| 2010/0035593 A1* | 2/2010 | Franco .................... | H04M 3/56 455/416 |
| 2010/0246802 A1* | 9/2010 | Valdez .................... | H04M 9/08 379/392.01 |
| 2013/0051543 A1* | 2/2013 | McDysan ........... | H04M 3/4286 379/202.01 |

OTHER PUBLICATIONS

United Kingdom Search Report dated Oct. 31, 2012 for GB1214369.9 filed Aug. 12, 2012.

* cited by examiner

AUTOMATIC CALL MUTING AND APPARATUS USING SOUND LOCALIZATION

CROSS-REFERENCE TO RELATED APPLICATIONS

This application is a U.S. national stage application under 35 U.S.C. §371 of International Application No. PCT/GB2013/052151 filed Aug. 13, 2013, which designates the United States and claims priority to Great Britain Application No. 1214369.9 filed on Aug. 13, 2012, both of which are incorporated by reference in their entireties.

The present invention relates to telephones and other portable devices capable of allowing voice calls to be made and received.

One of the biggest uses of telephone (including mobile) in the business environment is for teleconferences. The use of having business or personal meetings via video or teleconference has immensely increased in the last decade as companies are trying to save travelling costs or reduce building facilities to the absolute minimum, which might mean foregoing a meeting room or two and various other reasons. There is also an increase in number of micro or SME businesses, mostly contractors working on other client premises, working from home, use of outsourcing or off-shoring parts of business or business processes or as simple as having various offices in different geographic locations within the same city, county, country or a global organisation, and the only efficient and convenient mode of conducting meetings is via video or teleconferences.

During conference calls, individual microphones in a multi-microphone table console can automatically be switched in response to speech from individual speakers to best hear the individual speaker. If another speaker is present in substantially the same direction as the individual speaker, the other speaker can also be heard. Another problem occurs when an individual speaker has a quiet voice, causing the selected microphone to be switched in response to a relatively low sound from another speaker. The present invention seeks to overcome these conference call short comings.

Background noise during these teleconference cause huge amount of distractions, interference, lack of clarity or even lead to fatal errors due to the listener not being able to gather accurate information or data from or during the conversation. The present invention seeks to eliminate distractions and other interference dung a call.

This problem is further amplified when you have various background noises coming from difference users or when you have to keep taking the phone off your ear, place it on mute when not participating in the conversation and then again taking the phone off your ear and un-muting it when you are about to speak. Overall, it is a very inconvenient and poor customer/client or user experience.

Apart from conference calls, an individual telephone user may wish to make a call where the individual user alone is involved rather than surrounding speakers and noises. Once again, other and louder speakers can cause problems. The present invention seeks to provide improvement in one-speaker-only calls.

Another problem is with built-in communication systems in vehicles. When the vehicle is in motion, there is lot of surround noise from both within and outside the vehicle and user speaking or listening into telephone conversation using hands-free setup or otherwise experiences lack of clarity to a great extent. The present invention seeks to overcome these shortfalls.

The invention is here after described with reference to mobile telephone apparatus. It is to be appreciated that the invention equally applies to any voice communication apparatus, including, but not limited to: landline devices; mobile devices of all kinds; built-in communication systems in vehicles; Ipads(Trademark)/tablets; walkie-talkies; and Bluetooth (Trademark) headsets/handsets.

According to a first aspect, the present invention consists in a voice communication apparatus comprising:
  individual speaker sensor means, operable to determine individual speaker characteristics during a call; and
  muting means, operable to mute sound to the call if a speaking individual speaker is not an accepted individual speaker.

According to a second aspect, the present invention consists in a method for operating a voice communication apparatus, comprising:
  a step of sensing the characteristics of individual speakers during a call; and
  a step of muting the call if a speaking individual speaker is not an accepted individual speaker.

The invention further provides that the individual speaker characteristics can comprise at least one of: the position relative to the apparatus of the speaker; and the voice characteristics of the individual speaker.

The invention further provides that sensing the characteristics of individual speakers can also involve employing a plurality of sound sensors, at least one of the sound sensors being a microphone.

The invention also provides that sensing the position of individual speakers can comprise at least one of: comparing individual speaker sound loudness between sound sensors; comparing individual speaker sound phase between sound sensors; and comparing of individual speaker sound arrival time between sound sensors.

The invention also provides that sensing the voice characteristics of individual speakers can include at least one of: performing audio signal analysis of the sound of individual speaker's voices; and use of voice CODEC analysis results for each individual speaker.

The invention also provides for a default position of an individual speaker being immediately proximate the microphone.

The invention also provides for positional tolerance of individual speakers being allowed.

The invention is further described, by way of example, by the following description to be read in conjunction with the appended drawings, in which.

Figure 1:
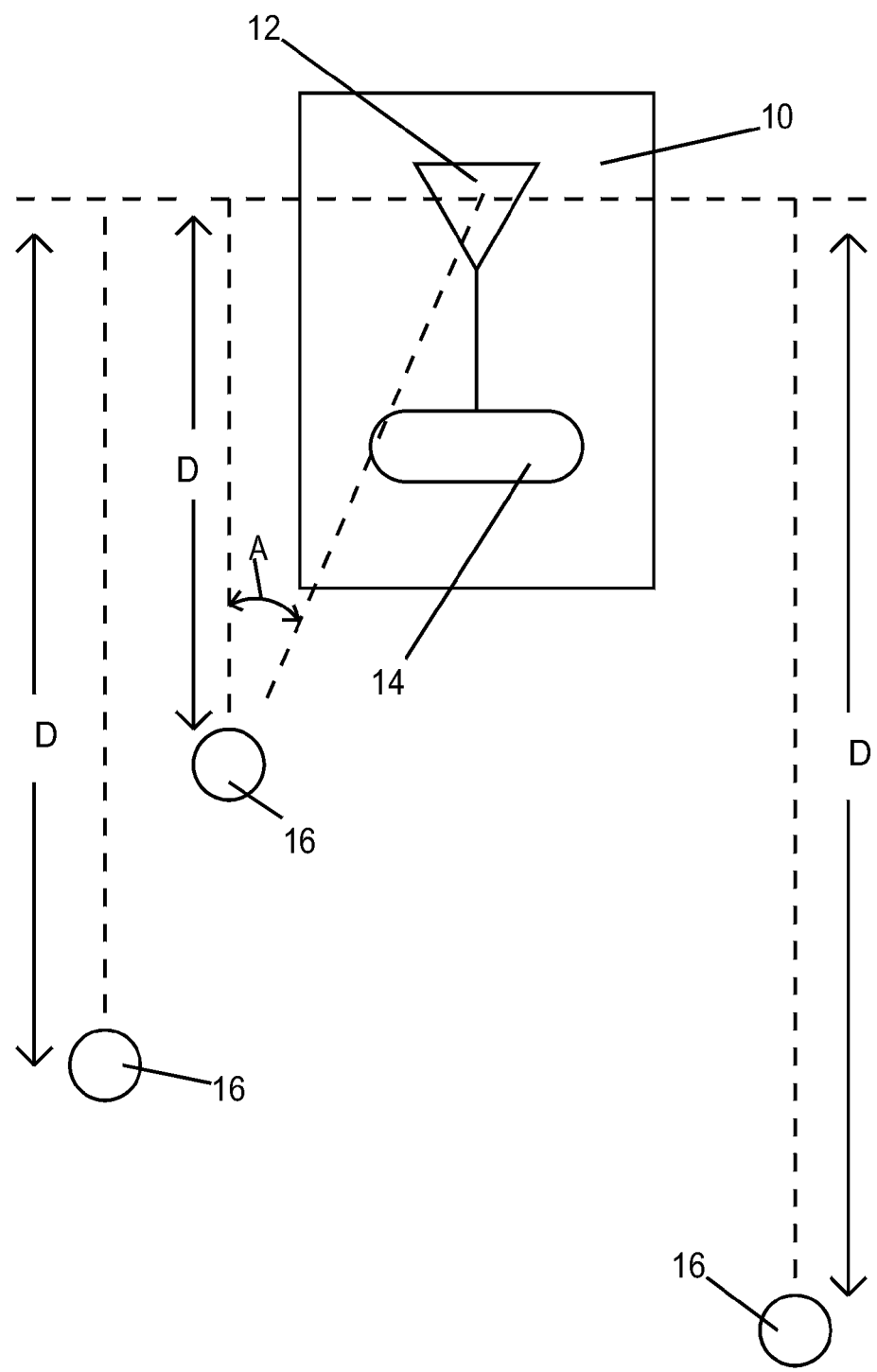
FIG. 1 is a block diagram showing essential elements required in a mobile telephone to practise the invention.

Attention is first drawn to FIG. 1, showing a block diagram of essential elements required in a mobile telephone to practise the invention.

A mobile telephone 10 is provided. The mobile telephone is preferably a 3G or 4G device, in the form, for example, of an IPhone (Trademark) of any other 3G and 4G device. The mobile telephone cam also comprise other devices, such as any of a range of telephone communication tablets and pads.

The mobile telephone 10 also comprises an audio sensor 12 for sensing and providing output signals representative of speech and other sounds that can occur around the mobile telephone during a call. The audio sensor 12 is more than a mere microphone, but contains other elements capable, as will be explained, of providing not only voice signals, but also other information useable to determine directions, ranges and nature of sounds in relation to the mobile telephone.

Signals from the audio sensor 12 are provided as input to mute control means 14 that determines whether or not the signals from the audio sensor 12 are provided as contribution to an ongoing telephone call.

As will be described hereunder, the mute control means 14, in order to judge the direction and range of an individual speaker 16 can use one, some or all of: relative time of arrival of sound components, relative phase of individual sound components; and loudness of individual sound components. In this manner, the distance D of each individual speaker (or other sound source) and the angle A to that individual speaker 16 can be measured and used in the muting process to distinguish individual speaker 16 ranges and direction.

The mute control 14 is also able to judge the voice identity of individual speakers 16, by means, for example, of audio signal analysis and/or use of voice CODEC (coder and decoder) analysis, as now used in most all mobile telephones to provide digital signals to send and audio signal to receive, to determine voice click repetition rate and vocoder filter settings, to name but two options available.

The mute control means can use one, some or all of the above measures to determine position and identity of individual speakers 14.

Attention is next drawn to FIG. 2A to 2D that show exemplary possibilities for positioning of elements of an exemplary mobile telephone 10.

Figure 2A:
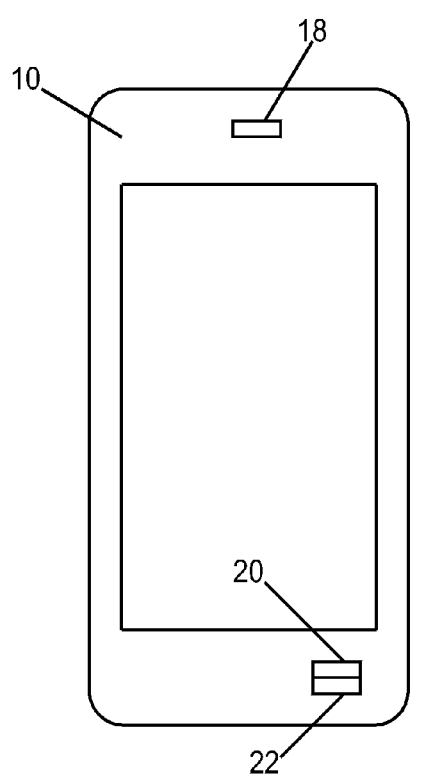
FIG. 2A to 2D show exemplary possibilities for positioning of elements of an exemplary mobile telephone 10.

In FIG. 2A, an earpiece 18 allows a person to listen to a call. Of course, the call may be amplified to allow more than one person to listen, if required. A microphone 20 provides sound signals to be sent in a telephone call.

Sound location sensors 22 provide signals to the mute control means 14 to assist with position sensing for individual speakers 16.

Figure 2B:
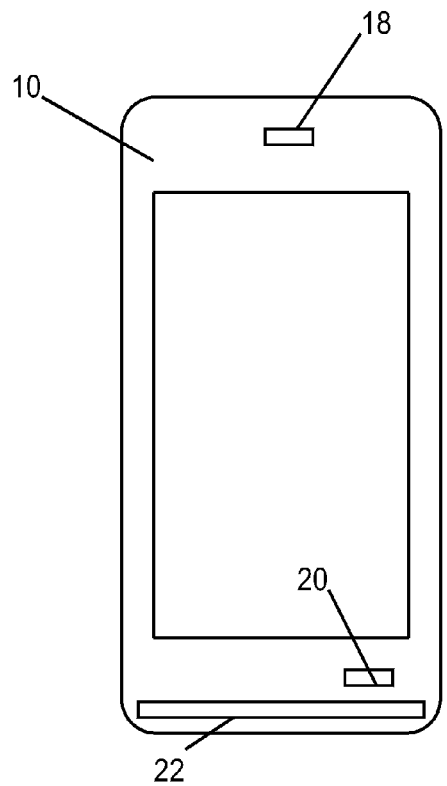
Figure 2C:
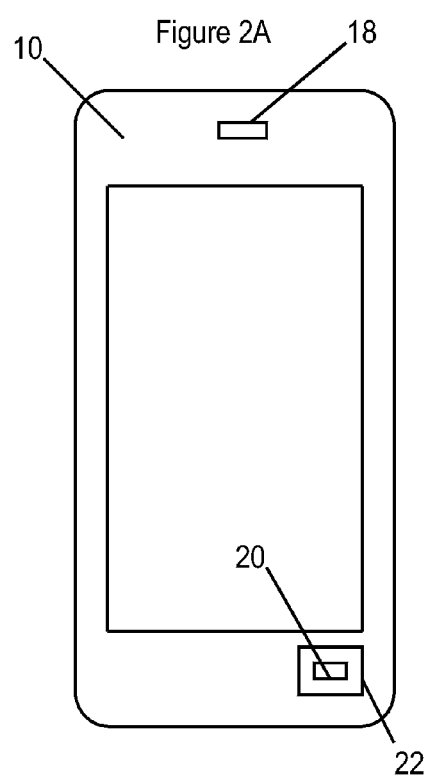
Figure 2D:
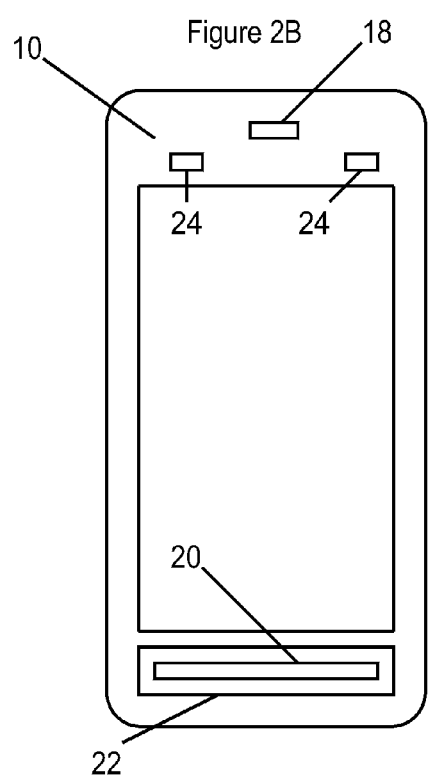

The location sensors 22 in FIG. 2A are shown situated adjacently to the microphone 20. FIG. 2B shows another possibility where the location sensors 22 are shown in an extended form on the same end of the mobile telephone 10 as the microphone. FIG. 2C shows yet another possibility where the sound location sensors 22 are provided surrounding the microphone 20 (or vice-versa) and FIG. 2D shows an extended sound location sensor 22 surrounded by an extended microphone 20.

Sound location sensors 22 each comprise one or more spaced sub-microphones able to provide signals to the mute control means 14 to enable phase and/or sound time of arrival to be assessed. If there is only one sub-microphone, it is used in conjunction with the microphone 20 to provide the mute control means 14 with signals to determine sound source direction and range.

The spacing of sound location sensors 22 is preferably as wide as possible on the face of the mobile telephone 10, to enable accurate determination of time of arrival and/or sound phase. As shown in FIG. 2D, additional sound location sensors 24 can be provided at wide spacing from one another and from the microphone 20 and sound location sensors 22 for better location determining accuracy.

It is to be understood that the microphone 20 can be an integral part of the one or more sound location sensors 22 24.

Figure 3:
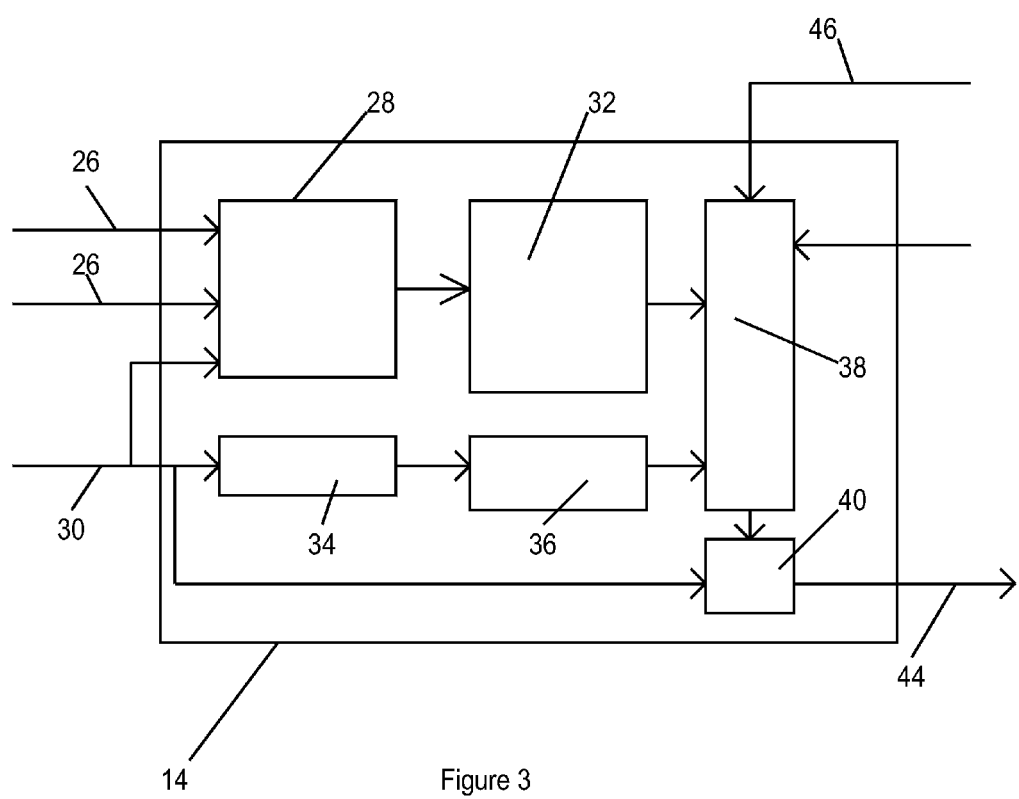
FIG. 3 is an exemplary block diagram showing one possible implementation of the mute control means.

Attention is next drawn to FIG. 3, an exemplary block diagram showing one possible implementation of the mute control means 14.

The mute control means 14 comprises sound location sensor inputs 26 delivered as input to a time/phase detector 28 that measures times and phases in sounds received by the location sensors 22, 24. A microphone input 30 is provided by the microphone 20 and can also be provided, if required, as an input to the time phase detector 28. The time phase detector provides input to a position calculator 32 that takes phase and time detected output from the time/phase detector 28 and turns them into an output indicative of the locations of each sound source or individual speaker 16 heard.

The microphone input 30 is provided to a voice characteristic analyser 34 operable to analyse the incoming microphone 20 signal and to provide output indicative of that analysis to voice analysis decision means 36 that provides logical output indicative of the analysis.

The outputs of the position calculator 32 and of the voice analysis decision means 36 are provided as input to switching control logic 38 that drives an on/off gate 40. When the on/off gate 40 is open, the microphone input 30 is delivered as phone input 42 to drive a mobile telephone 10 modulation system in the normal way. When the on/off gate 40 is closed, the microphone input 30 is blocked from delivery as phone input 42 and the mobile telephone 10 is muted.

The mobile telephone delivers a dynamic mute signal 46 to the switching control logic 38 to control whether of or not dynamic muting is employed whereby only elected individual speaker of speakers 16 are allowed to provide unmuted input. If the dynamic mute signal 46 is not in an active state, the on/off gate 40 is permanently open and all sounds and individual speakers 16 are to be found on the phone input 40.

If the dynamic mute signal 46 is in an active state, the on/off gate 40 is open or closed depending upon where the individual speaker 16 is located and upon the qualities of his voice, whereby sounds originating only from selected individual speakers 16 are to be found on the phone input 40.

A speaker selection input 48 is applied to the switching control logic 38 to select a particular individual speaker 16 when that speaker 16 is speaking. Different speakers 16 can thereby be selected.

Voice analysis can include, but is not limited to: spectral analysis using, for example, Fast Fourier Transform; and/or use of voice CODEC (coder and decoder) analysis, as now used in most all mobile telephones to generate digital signals from analogue microphone input to send digital telephone signals.

As a default, it is preferred that the selected position for an individual speaker 16 be immediately front of the microphone 20.

An option allows that voice analysis can be ignored or not performed and only individual speaker 16 position taken into account. Another option is that individual speaker 16 position can be ignored and only voice analysis taken into account. This produces the interesting result that only a chosen individual speaker 16 can use speak on the telephone, no matte where the chosen individual speaker 16 is located.

The description of FIG. 3 has been given as a piece of hardware. It is to be appreciated that FIG. 3 is given as just one example of possible embodiments that would be apparent to the skilled man without departing from the invention as claimed. It s also to be appreciated that the functions ascribed to FIG. 3 can be provided, in whole or in part, by a programmed processor operable in association with the mobile telephone 10 operating system.

Figure 4:
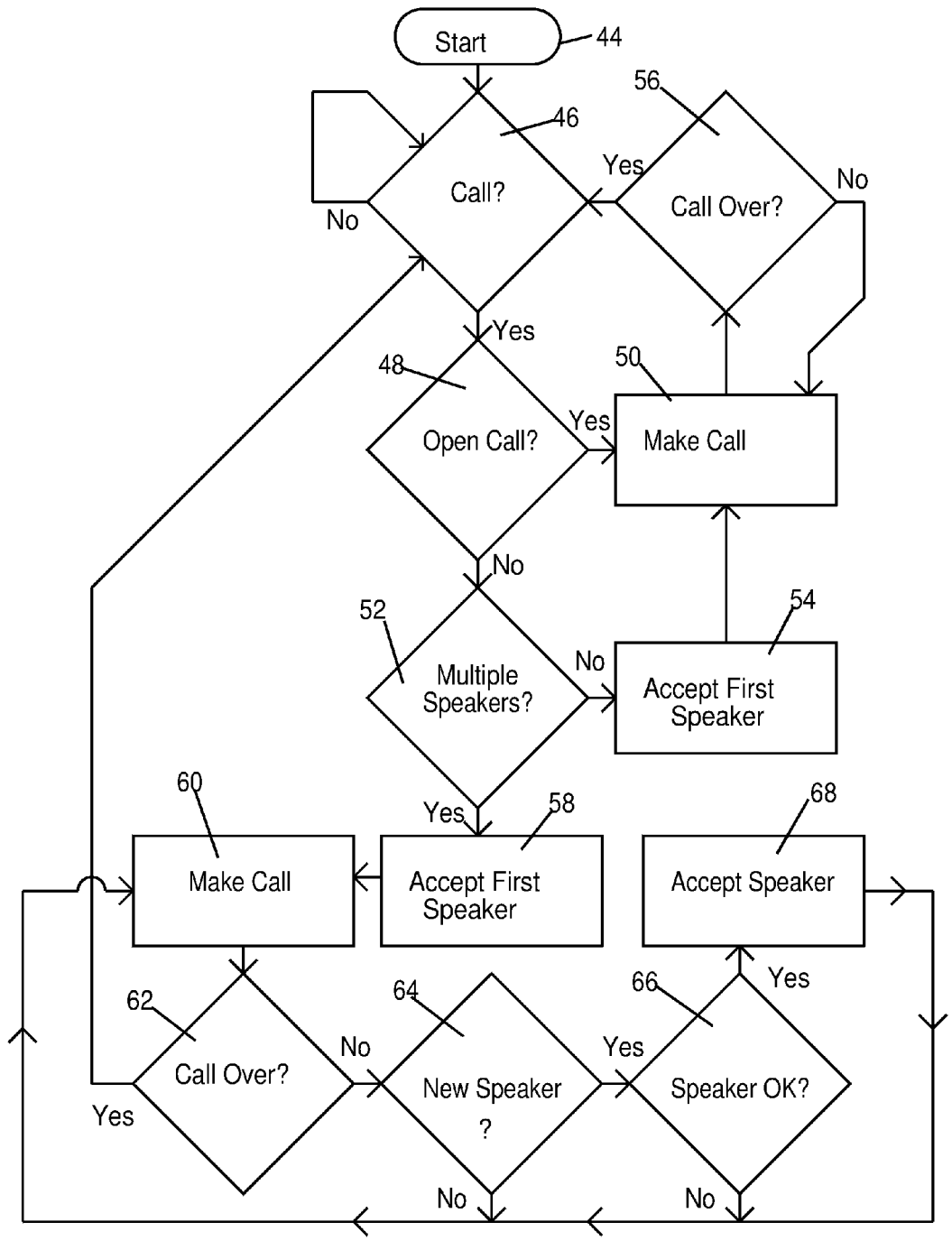
FIG. 4 is an exemplary flow chart showing one way in which the mobile telephone can be used in implemention of the invention.

Attention is finally drawn to FIG. 4, an exemplary flow chart showing one way in which the mobile telephone 10 can be used to implement the invention.

From a start-up 44 a first test 46 checks to see if a call is to be made. If not, the first test 46 just keeps looking. If a call is to be made, the first test passes control to a second test 48 which determines whether or not the mobile telephone user wishes the call to be made is to be an open call, that is, a call where automatic muting is not to be employed.

It the call is not to be subject to automatic muting, a first operation 50 allows the call to proceed with all parties present able to be heard in the call.

If the call is to be subject to automatic muting, the second test 48 passes control to a third test 52 that checks to see if the mobile telephone user wishes to have multiple individual speakers 16n for a conference call.

If the mobile telephone user does not desire to have multiple individual speakers 16, meaning the call is to be conducted by only one person, the third test 52 passes control to a second operation 54 that accepts the first speaker as defining input. Whenever the accepted individual speaker speaks, the mobile telephone is un-muted. For all other individual speakers 16, the mobile telephone is muted. Acceptance of a speaker involves acceptance of one, the other or both of the selected speaker's location and the selected speaker's voice characteristics. The user can select what is desired control is then passed to the first operation 50 to proceed with the call, this time with the mobile telephone 10 muted except to the first accepted individual speaker. The first operation 50 maintains the call until a fourth test 56 detects that the call is over and passes control back to the first test 46 to wait for the next call.

If the mobile telephone user does desire to have multiple individual speakers 16, meaning the call is to be conducted by, the third test 52 passes control to a third operation 58 that, like the second operation 54, accepts the first speaker as defining input. A fourth operation 60, just like the first operation 50, allows the call to proceed this time with only selected individual speakers 16 able to participate. A fifth test 62 then checks to see if the call is over. If it is, the fifth test 62 passes control back to the first test 46 to await a further call. If the fifth test 62 finds that the call is not over, a sixth test 64 checks to see if a new individual speaker is present in the sound area vicinity. If there is no new speaker, the sixth test 64 passes control back to the fourth operation 60. If the sixth test 64 finds that there is a new individual speaker 16 present to be heard, a seventh test 66 checks to see if the new individual speaker is accepted by the mobile telephone user. If the new individual speaker 16 is not accepted by the mobile telephone user, the seventh test 66 passes control back to the fourth operation 60.

If the seventh test 66 finds that the mobile telephone user wishes to have the new individual user 16 accepted, a fifth operation 68 accepts the position and/or the voice characteristics of the new individual user 16 to be added to an expandable list of individual speakers 16 for which, during that particular call, the mobile telephone 10 will become un-muted when they speak.

FIG. 4 and the associated description are only exemplary, and those, skilled in the art, will be aware of many variations and modification of how this may be achieved within the invention as claimed below, Other examples of how a user can activate or enable in-call auto muting include: setting the in-call auto muting capability as a default criteria for all calls on the phone 10; enabling the in-call auto muting capability while answering the call i.e. call answering functionality combined with in-call auto muting capability; and enabling the in-call auto muting capability after answering a call.

Where a first individual speaker 16 is to be accepted, it is preferred that the first individual speaker 16 location also be the nearest individual speaker 16 to the microphone 20, and that a positional tolerance level be allowed, for an example: +/−5% to +/−10% for calls restricted to single individual speaker 16 participation, and that the same tolerance for positions be applied for other selected individual speakers 16 where more than one individual speakers is able to join in a call.

The overall drawings shown and description provided are also merely exemplary, and those, skilled in the art, will again be aware of many variations and modification of how this may be constructed and achieved within the invention as claimed below.

The invention is more clearly set forth and defined by the claims, appended below.

The invention claimed is:

1. A voice communication apparatus comprising:
an individual speaker sensor means operable to,
  receive instructions from a user of the voice communication apparatus, to make a call;
  upon receipt of the instructions to make the call, determine whether the call is to be subjected to automatic muting;
  upon determining that the call is to be subjected to automatic muting, ascertain whether the call is a conference call comprising a plurality of individual speakers, the plurality of individual speakers include the user of the voice communication apparatus;
  based on ascertaining that the call is the conference call comprising the plurality of individual speakers, determine a position and a voice identity of each of the plurality of individual speakers based on a sound component associated with each of the plurality of individual speakers
a position calculator to,
  determine a distance of a respective individual speaker along a longitudinal axis normal to a lateral axis of an audio sensor of the voice communication apparatus; and
  determine an angle formed between the longitudinal axis passing through the respective individual speaker and a straight line joining the respective individual speaker with the audio sensor,
  wherein the distance and the angle are determined by comparing loudness, phase, and arrival time of the sound component associated with the respective individual speaker;
a speaker selecting means to,
  receive voice signals pertaining to an individual speaker from the plurality of individual speakers, when the individual speaker speaks during the conference call;
  automatically select the individual speaker as an accepted individual speaker based on the respective position and voice identity associated with the individual speaker; and
an automatic muting means operable to automatically unmute the voice communication apparatus to provide audio signals to the conference call when the accepted individual speaker is speaking and to automatically mute the voice communication apparatus to block audio signals when the accepted individual speaker is not speaking.

2. The voice communication apparatus as claimed in claim 1, wherein the individual speaker sensor means comprises a plurality of sound sensors and at least one sound location sensor, and wherein at least one of the plurality of sound sensors is a microphone.

3. The voice communication apparatus as claimed in claim 2, wherein the at least one sound location sensor is configured to determine the arrival time and the phase of the sound component associated with the respective individual speaker.

4. The voice communication apparatus as claimed in claim 1, wherein the voice identity of each individual speaker is determined by at least voice CODEC analysis results for each individual speaker.

5. The voice communication apparatus as claimed in claim 1, wherein a positional tolerance of the individual speaker from the individual sensor means is +/−5% to +/−10%.

6. The voice communication apparatus as claimed in claim 1, wherein the individual speaker sensor means is operable to,
    detect presence of a new individual speaker in addition to the plurality of individual speakers in vicinity of the voice communication apparatus;
    based on detecting the presence of the new individual speaker, determine whether the mobile phone user accepts the new individual speaker to speak in the conference call; and
    based on determining the acceptance of the new individual speaker, sense the characteristics associated with the new individual speaker.

7. The voice communication apparatus as claimed in claim 6, wherein the automatic muting means is operable to, upon sensing the position and voice identity of the new individual speaker, automatically unmute the voice communication apparatus to provide audio signals to the conference call when the new individual speaker is speaking and to automatically mute the voice communication apparatus to block audio signals when the new individual speaker is not speaking.

8. The voice communication apparatus as claimed in claim 1, wherein the individual speaker sensor means is to,
    ascertain whether the call is a conference call comprising a single individual speaker;
    based on the ascertainment that the call is the conference call comprising the single individual speaker, determine the position and the voice identity of the single speaker, based on the sound component associated with the single individual speaker;
a position calculator to,
    determine a distance of the single individual speaker along a longitudinal axis normal to a lateral axis of an audio sensor of the voice communication apparatus; and
    determine an angle formed between the longitudinal axis passing through the single individual speaker and a straight line joining the single individual speaker with the audio sensor,
    wherein the distance and the angle are determined by comparing loudness, phase, and arrival time of the sound component associated with the single individual speaker;
a speaker selecting means to,
    receive voice signals pertaining to the single individual speaker when the single individual speaker speaks during the conference call;
    automatically select the single speaker as the accepted individual speaker based on the position and voice identity associated with the single individual speaker; and
an automatic muting means operable to automatically unmute the voice communication apparatus to provide audio signals to the call when the accepted individual speaker is speaking and to automatically mute the voice communication apparatus to block audio signals when the accepted individual speaker is not speaking.

9. The voice communication apparatus as claimed in claim 8, wherein a default position of the single individual speaker is immediately proximate the individual speaker sensor means.

10. A method for operating a voice communication apparatus, comprising:
    receiving instructions from a user of the voice communication apparatus, to make a call;
    upon receiving the instructions to make the call, determining whether the call is to be subjected to automatic muting;
    upon determining that the call is to be subjected to automatic muting, ascertaining whether the call is a conference call comprising a plurality of individual speakers, the plurality of individual speakers include the user of the voice communication apparatus;
    based on ascertaining that the call is the conference call comprising the plurality of individual speakers, sensing a position and a voice identity of each of the plurality of individual speakers, based on a sound component associated with each of the plurality of individual speakers; wherein sensing the position of each individual speaker comprises:
        determining a distance of a respective individual speaker along a longitudinal axis normal to a lateral axis of an audio sensor of the voice communication apparatus; and
        determining an angle formed between the longitudinal axis passing through the respective individual speaker and a straight line joining the respective individual speaker with the audio sensor,
        wherein the distance and the angle are determined based on loudness, phase, and arrival time of the sound component associated with the respective individual speaker;
    receiving voice signals pertaining to an individual speaker from the plurality of individual speakers, when the individual speaker speaks during the conference call;
    automatically selecting the individual speaker as an accepted individual speaker based on the respective position and voice identity associated with the individual speaker; and
    automatically unmuting the voice communication apparatus to provide audio signals to the conference call when the accepted individual speaker is speaking and automatically muting the voice communication apparatus to block audio signals when the accepted individual speaker is not speaking.

11. The method as claimed in claim 10, wherein sensing the position and voice identity pertaining to each individual speaker comprises employing a plurality of sound sensors and at least one sound location sensor, and wherein at least one of the sound sensors is a microphone.

12. The method as claimed in claim 10, wherein sensing the voice identity of each individual speaker comprises performing at least a voice CODEC analysis for each individual speaker.

13. The method as claimed in claim 10, wherein a positional tolerance of an individual speaker from the audio sensor is +/−5% to +/−10%.

14. The method as claimed in claim 10, comprising:
detecting presence of a new individual speaker in addition to the plurality of individual speakers in vicinity of the voice communication apparatus;
based on detecting the presence of the new individual speaker, determining whether the user of the voice communication apparatus accepts the new individual speaker to speak in the conference call;
based on determining the acceptance of the new individual speaker, sensing the position and voice identity associated with the new individual speaker; and
upon sensing the position and voice identity of the new individual speaker, automatically unmuting the voice communication apparatus to provide audio signals to the conference call when the new individual speaker is speaking and automatically muting the voice communication apparatus to block audio signals when the new individual speaker is not speaking.

15. The method as claimed in claim 10, wherein, upon ascertaining that the call is a conference call comprising a single individual speaker, the method comprising:
sensing the position and the voice identity of the single individual speaker based on a sound component associated with the single individual speaker, wherein sensing the position of the single individual speaker comprises:
determining a distance of the single individual speaker along a longitudinal axis normal to a lateral axis of an audio sensor of the voice communication apparatus; and
determining an angle formed between the longitudinal axis passing through the single individual speaker and a straight line joining the single individual speaker with the audio sensor,
wherein the distance and the angle are determined based on loudness, phase, and arrival time of the sound component associated with the single individual speaker;
automatically selecting the single individual speaker as the accepted individual speaker based on the position and voice identity associated with the single individual speaker; and
automatically unmuting the voice communication apparatus to provide audio signals to the call when the accepted individual speaker is speaking and to automatically mute the voice communication apparatus to block audio signals when the accepted individual speaker is not speaking.

16. The method as claimed in claim 15, wherein a default position of the single individual speaker is immediately proximate the audio sensor.

17. A voice communication apparatus, comprising an audio sensor and a processor configured to:

receive instructions from a user of the voice communication apparatus, to make a call;
upon receipt of the instructions to make the call, determine whether the call is to be subjected to automatic muting;
upon determining that the call is to be subjected to automatic muting, ascertain whether the call is a conference call comprising a plurality of individual speakers, the plurality of individual speakers include the user of the voice communication apparatus;
based on ascertaining that the call is the conference call comprising the plurality of individual speakers, determine, a position and a voice identity of each of the plurality of individual speakers based on a sound component associated with each of the plurality of individual speakers;
determine a distance of a respective individual speaker along a longitudinal axis normal to a lateral axis of an audio sensor of the voice communication apparatus;
determine an angle formed between the longitudinal axis passing through the respective individual speaker and a straight line joining the respective individual speaker with the audio sensor,
wherein the distance and the angle are determined by comparing loudness, phase, and arrival time of the sound component associated with the respective individual speaker;
receive voice signals pertaining to an individual speaker from the plurality of individual speakers, when the individual speaker speaks during the conference call;
automatically select an individual speaker from amongst the plurality of individual speakers as an accepted individual speaker based on the respective position and voice identity associated with the individual speaker;
automatically unmute the voice communication apparatus to provide audio signals to the conference call when the accepted individual speaker is speaking and to automatically mute the voice communication apparatus to block audio signals when the accepted individual speaker is not speaking,
detect presence of a new individual speaker in addition to the plurality of individual speakers in vicinity of the voice communication apparatus;
based on detecting the presence of the new individual speaker, determine whether the user of the voice communication apparatus accepts the new individual speaker to speak in the conference call;
based on determining the acceptance of the new individual speaker, sense the position and voice identity associated with the new individual speaker; and
upon sensing the position and voice identity of the new individual speaker, automatically unmute the voice communication apparatus to provide audio signals to the conference call when the new individual speaker is speaking and automatically mute the voice communication apparatus to block audio signals when the new individual speaker is not speaking.

* * * * *

UNITED STATES PATENT AND TRADEMARK OFFICE
CERTIFICATE OF CORRECTION

| | | |
|---|---|---|
| PATENT NO. | : 9,756,187 B2 | Page 1 of 1 |
| APPLICATION NO. | : 14/421692 | |
| DATED | : September 5, 2017 | |
| INVENTOR(S) | : Sandeep Kumar Chintala | |

It is certified that error appears in the above-identified patent and that said Letters Patent is hereby corrected as shown below:

In the Specification

Column 4, Line 30 reads:
"to the switching control logic 38 to control whether of or not"
Should read:
-- to the switching control logic 38 to control whether or not --

Signed and Sealed this
Seventh Day of November, 2017

Joseph Matal
*Performing the Functions and Duties of the*
*Under Secretary of Commerce for Intellectual Property and*
*Director of the United States Patent and Trademark Office*